(12) United States Patent
Wyble (10) Patent No.: US 7,898,674 B2
(45) Date of Patent: Mar. 1, 2011

(54) APPARATUS AND METHOD FOR DETECTING THE POSITION OF MEDIA IN A MEDIA PATH

(75) Inventor: Thomas J. Wyble, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 359 days.

(21) Appl. No.: 12/136,877

(22) Filed: Jun. 11, 2008

(65) Prior Publication Data

US 2009/0310974 A1 Dec. 17, 2009

(51) Int. Cl.
*G01B 11/14* (2006.01)
(52) U.S. Cl. .................................. 356/614; 356/615
(58) Field of Classification Search ......... 356/614–615, 356/621–622, 625, 28, 402, 444, 445; 250/221–222.1, 250/223 R, 559.36, 559.29, 559.01; 198/502.4, 198/301, 300; 347/19; 398/129, 128, 130
See application file for complete search history.

(56) References Cited

U.S. PATENT DOCUMENTS

| | | | |
|---|---|---|---|
| 4,001,581 A * | 1/1977 | Murata | .................. 250/239 |
| 5,349,199 A | 9/1994 | Rabjohns et al. | |
| 5,383,014 A | 1/1995 | Nowak et al. | |
| 2005/0100385 A1* | 5/2005 | Sato | .................... 400/708 |
| 2005/0151974 A1 | 7/2005 | Butterfield et al. | |
| 2008/0018913 A1 | 1/2008 | Ossman et al. | |

* cited by examiner

*Primary Examiner*—Gregory J Toatley
*Assistant Examiner*—Tri T Ton
(74) *Attorney, Agent, or Firm*—Matthew C. Loppnow; Prass LLP (57) ABSTRACT

An apparatus (100) and method (200) that detects the position of media (116) in a media path is disclosed. The apparatus may include a media transport (110) configured to transport media and an optical transmitter (140) coupled to the media transport, where the optical transmitter can be configured to transmit light (122). The apparatus may also include a concave reflector (130) coupled to the media transport and optically coupled to the optical transmitter, where the concave reflector can be configured to reflect light from the optical transmitter. The apparatus may further include an optical receiver (140) coupled to the media transport, the optical receiver configured to receive light (132) from the optical transmitter reflected off the concave reflector. The apparatus may additionally include a controller (160) configured to determine a position of the media based on the received light from the optical transmitter reflected off the concave reflector.

18 Claims, 7 Drawing Sheets

APPARATUS AND METHOD FOR DETECTING THE POSITION OF MEDIA IN A MEDIA PATH

BACKGROUND

Disclosed herein is an apparatus and method that detects the position of media in a media path.

Presently, devices such as printers, scanners, copiers, multi-function devices, and other devices interact with media, such as sheets, paper, transparencies, plastic, cardboard, or other media. In order for such devices to interact properly with the media, a device must be able to accurately detect the position of the media at various locations in a media path of the device. Media sensors can be used to detect media in the media path. The media sensors can be used for registration, such as position detection, for learning algorithms, for sheet size detection, and for other media sensing functions in a media path. The media path of a device can have baffles that provide enough space between them to accommodate various types of media and to efficiently transport the media. This space between the baffles can allow some variability for the fly height of media and can also allow some curling of media traveling through the media path.

Media sensors in a device can use a conical shaped beam of light reflected off of a reflector to detect the media location. The cone shaped beam of light can cause the light that is reflected off the reflector to also be conical shaped. Unfortunately, the variability of the fly height of media in the media path combined with the cone shaped light can cause a media sensor to start detecting media at different times, which can result in errors in the detected location of the media. For example, the variability of the fly height can result in errors when detecting the lead edge and the trail edge of media traveling through the media path.

For example, the baffles of a media path can be located 3 mm apart. This distance can allow for a variability of 3 mm in media fly height and/or curling of the media in the media path. This difference in media fly height and curling can cause a standard media sensor to have a location detection error of from 0.1 to 0.2 mm. Such an error is not acceptable for precise detection of media in a media path. Thus, there is a need for an apparatus and method that more accurately detects the position of media in a media path.

SUMMARY

An apparatus and method that detects the position of media in a media path is disclosed. The apparatus may include a media transport configured to transport media and an optical transmitter coupled to the media transport, where the optical transmitter can be configured to transmit light. The apparatus may also include a concave reflector coupled to the media transport and optically coupled to the optical transmitter, where the concave reflector can be configured to reflect light from the optical transmitter. The apparatus may further include an optical receiver coupled to the media transport, the optical receiver configured to receive light from the optical transmitter reflected off the concave reflector. The apparatus may additionally include a controller configured to determine a position of the media based on the received light from the optical transmitter reflected off the concave reflector.

BRIEF DESCRIPTION OF THE DRAWINGS

In order to describe the manner in which advantages and features of the disclosure can be obtained, a more particular description of the disclosure will be rendered by reference to specific embodiments thereof which are illustrated in the appended drawings. Understanding that these drawings depict only typical embodiments and are not therefore to be considered to be limiting of its scope, the disclosure will be described and explained with additional specificity and detail through the use of the accompanying drawings in which.

DETAILED DESCRIPTION

The embodiments include an apparatus for detecting the position of media in a media path. The apparatus can include a media transport configured to transport media and an optical transmitter coupled to the media transport. The optical transmitter can be configured to transmit light. The apparatus can also include a concave reflector coupled to the media transport and optically coupled to the optical transmitter. The concave reflector can be configured to reflect light from the optical transmitter. The apparatus can additionally include an optical receiver coupled to the media transport. The optical receiver can be configured to receive light from the optical transmitter reflected off the concave reflector. The apparatus can further include a controller configured to determine a position of the media based on the received light from the optical transmitter reflected off the concave reflector.

The embodiments further include an apparatus for detecting the position of a sheet in a sheet transport path. The apparatus can include a sheet transport path configured to transport a sheet in a movement direction in the sheet transport path. The apparatus can also include a reflector coupled to the sheet transport path and an optical sheet sensor optically coupled to the reflector. The optical sheet sensor can include a transmitter configured to transmit light in a direction of the reflector and a receiver configured to receive light transmitted from the transmitter and reflected off the reflector. The apparatus can additionally include a controller configured to determine a position of the sheet based on the received light reflected off the reflector. The reflector can be concave towards the optical sheet sensor.

The embodiments further include a method of detecting the position of media in an apparatus having a media transport path, an optical transmitter, a concave reflector, and an optical receiver. The method can include transporting media in the media transport path and directing light from the optical transmitter to the concave reflector as media is transported in the media transport path. The method can include reflecting the light off the concave reflector to direct reflected light through the media transport path to the optical receiver. The method can include sensing the reflected light at the optical receiver and providing a signal based on the sensed reflected light. The method can include determining a position of the media in the media transport path based on the signal.

Figure 1:
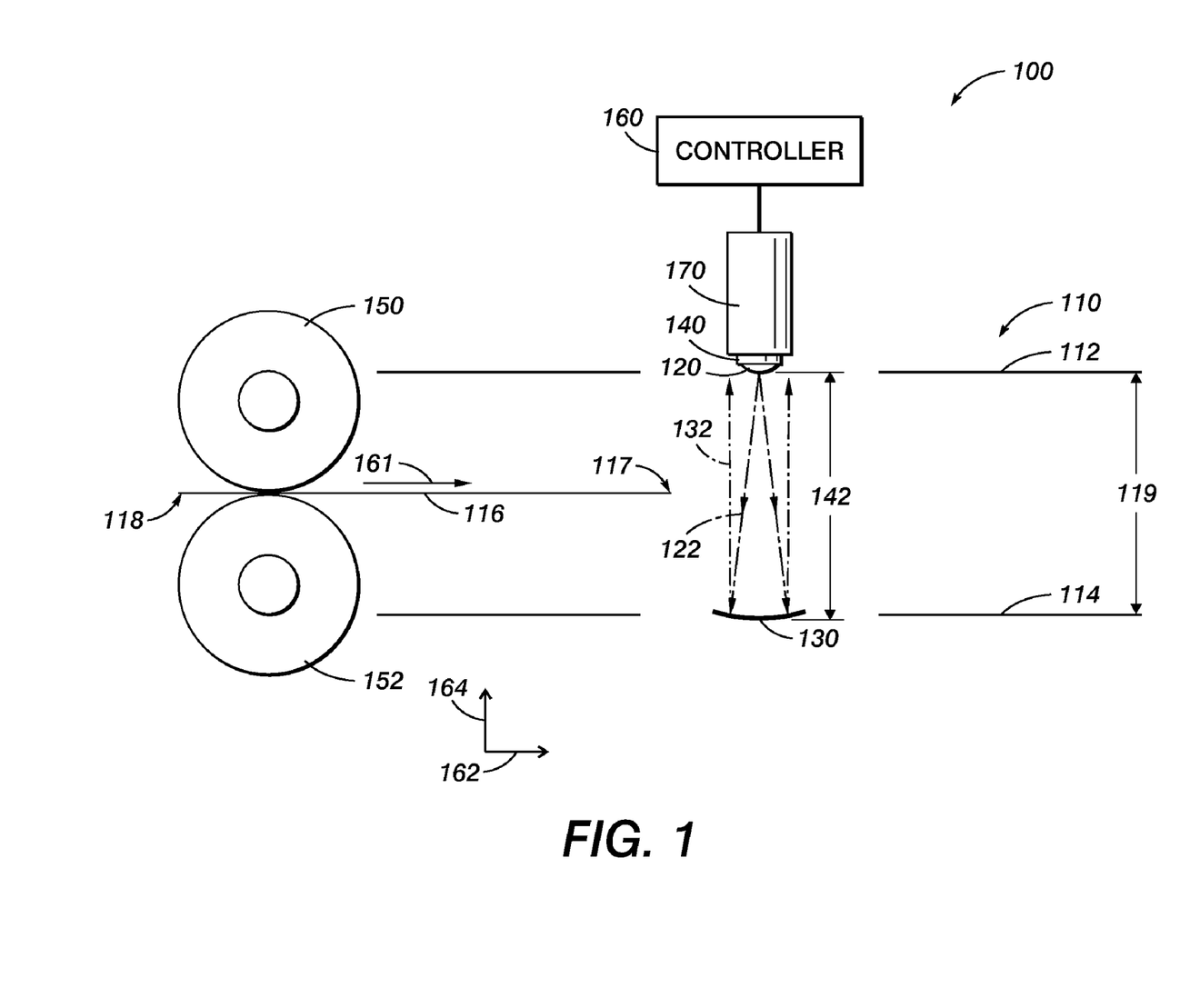
FIG. 1 is an exemplary illustration of an apparatus according to a possible embodiment.

FIG. 1 is an exemplary illustration of an apparatus 100. The apparatus 100 may be a document feeder, a printer, a scanner, a multifunction media device, a xerographic machine, or any other device that transports media. The apparatus 100 can include a media transport 110 configured to transport media 116. The apparatus 100 can include an optical transmitter 120 coupled to the media transport 110, where the optical transmitter 120 can transmit light 122. The apparatus 100 can include a concave reflector 130 coupled to the media transport 110 and optically coupled to the optical transmitter 120. The concave reflector 130 can reflect the light from the optical transmitter 120. The apparatus 100 can include an optical receiver 140 coupled to the media transport 110, where the optical receiver 140 can receive light 132 from the optical transmitter 120 reflected off the concave reflector 130. The optical receiver 140 can be located next to, adjacent with, or proximal to the optical transmitter 120 or can be located anywhere else it can be used in conjunction with the optical transmitter 120. The apparatus can include a controller 160 configured to determine a position of the media 116 based on the received light 132 from the optical transmitter 120 reflected off the concave reflector 130.

The illustration of the apparatus 100 is not necessarily drawn to scale. The optical receiver 140 can be located at a distance 142 from the concave reflector 130 and the concave reflector 130 can have a radius that substantially matches the distance 142 from the optical receiver to the concave reflector. The optical transmitter 120, the optical receiver 140, and the concave reflector 130 may also be located at various distances from the media transport 110.

The apparatus 100 can include a driven drive roll 150 and another roll 152, such as a non-driven idler roll or another driven drive roll coupled to the media transport 110. The driven drive roll 150 and the another roll 152 can feed document media 116 between the concave reflector 130 and the optical receiver 140. The media 116 can be paper media, transparency media, cardboard media, plastic media, or any other media that can be transported in a media transport 112.

The media transport 110 can include a first side 112 and a second side 114. The optical transmitter 120 and the optical receiver 140 can be coupled to the first side 112 of the media transport 110. The concave reflector 130 can be coupled to the second side 114 of the media transport 110. The first side 112 of the media transport 110 can be a first baffle and the second side 114 of the media transport 110 can be a second baffle. The first baffle can be located a distance from the second baffle of between substantially 2 mm and substantially 5 mm, although other distances could be used.

The optical receiver 140 can output a signal in response to receiving reflected light 132 from the optical transmitter 120 via the concave reflector 130. The signal can correspond to a location of the media 116 in the media transport 110. For example, the optical receiver 140 can be coupled to the controller 160 that controls the operations of the apparatus 100. The optical receiver can output the signal to the controller 160. The optical receiver 140 can output a signal that changes when the media 116 comes between the concave reflector 130 and the optical receiver 140. The signal may be a voltage that changes as the media 116 begins to block some of the light 132 reflected off the concave reflector 130. Thus, the optical receiver 140 can detect a leading edge 117 of the media 116 and output a related voltage as the media 116 begins to obstruct the reflected light 132. Similarly, the optical receiver 140 can detect a trailing edge 118 of the media 116 and output a related voltage as the media begins to unblock the reflected light 132. As a further example, the signal can be a voltage level corresponding to light received at the optical receiver 140. The voltage level can be based on an x-axis 162 location based on a direction of media travel 161 through the media transport 110. The voltage level can also be based on a y-axis 164 location based on the location of the media 116 between the optical receiver 140 and the concave reflector 130. For example, the y-axis 164 location can be based on the location of the media 116 between the baffles 112 and 114. Differences in voltage levels based on differences in the x-axis 162 location and the y-axis 164 location can be substantially zero at a given x-location and a given y-location. The controller 160 can determine a position of the media 116 based on a trip point substantially corresponding to the differences in voltage levels being substantially zero. The trip point can indicate an edge of the media 116 is proximal to the optical receiver 140. For example, the radius of the concave reflector 130 can cause most of the light 122 emitted from the optical transmitter 120 to be reflected back to the optical receiver 140. This can cause the optical receiver's output waveforms to intersect around the midlevel, regardless of the media's fly height between the baffles. The output waveform can be the voltage outputs of the optical receiver 140 with respect to the position of the media 116. As a further example, a sensor 170 including the optical transmitter 120 and the optical receiver 140 can output a voltage of 5 volts as it detects the unobstructed light 132. The media 116 can begin to obstruct the light 132 as it travels between the reflector 130 and the sensor 170. The output voltage of the sensor 170 can change as the media 116 obstructs the light 132. The controller 160 can receive the output voltage from the sensor 170 and can use a threshold to determine when the media 116 is between the reflector 130 and the sensor 170. For example, the controller 160 can determine the media is at a given location when the output voltage of the sensor 170 reaches a threshold of 3 volts. The actual threshold value may be different depending on the desired results and the threshold value may be set or can be adjusted by the controller 160 or a designer of the apparatus 100. As another example, the signal from the optical receiver 140 can include a voltage level corresponding to light received at the optical receiver 140. The controller 160 can determine a position of the lead edge 117 of the media 116 based on a trip point corresponding to the voltage level crossing a threshold. The controller 160 can also determine a position of the trail edge 118 of the media 116 based on the trip point corresponding to the voltage level crossing the threshold.

Thus, the apparatus 100 can include a reflective type sensor 170 and a reflector 130 that has a radius. The radius of the reflector 130 can roughly match the distance 142 from the sensor 170 to the reflector 130. This radius can cause most of the light 122 emitted from the sensor 170 to reflect back as reflected light 132 to the sensor's receiver 140 and the sensor can more accurately detect the position of the media 116.

According to another related embodiment, the apparatus 100 can include a sheet transport path 110 configured to transport a sheet 116 in a movement direction 161 in the sheet transport path 110. The sheet 116 can be equivalent to the media used in other embodiments. The apparatus 100 can also include a reflector 130 coupled to the sheet transport path 110 and an optical sheet sensor 170 optically coupled to the reflector 130. The reflector 130 can be concave towards the optical sheet sensor 170. The optical sheet sensor 170 can include a transmitter 120 configured to transmit light 122 in a direction of the reflector 130 and a receiver 140 configured to receive light 132 transmitted from the transmitter 120 and reflected off the reflector 130. The apparatus 100 can include a controller 160 configured to determine a position of the sheet 116 based on the received light 132 reflected off the reflector 130. The optical sheet sensor 170 can sense a lead edge 117 corresponding to a beginning of the sheet 116 and a trail edge 118 corresponding to the end of the sheet 116 transported through the sheet transport path 110 in the movement direction 161. The optical sheet sensor 170 can be located at a distance 142 from the reflector 130 and the reflector 130 can have a radius that substantially matches the distance 142 from the optical sheet sensor 170 to the reflector 130. The apparatus 100 can include at least one driven drive roll 150 coupled to the sheet transport path 110. The driven drive roll 150 can feed the sheet 116 in the movement direction 161 between the reflector 130 and the optical sheet sensor 170. The apparatus 100 can include another roll 152 that can be a driven drive roll or a passive idler roll.

The sheet transport path 110 can include a first side 112 and a second side 114. The optical sheet sensor 170 can be coupled to the first side 112 of the sheet transport path 110. The reflector 130 can be coupled to the second side 114 of the sheet transport path 110. The first side 112 of the sheet transport path 110 can be a first baffle and the second side 114 of the sheet transport path 110 can be a second baffle. The first baffle can be located a distance from the second baffle of between substantially 2 mm and substantially 5 mm. Also, the optical sheet sensor 170 may be located a distance from the first side 112 of the sheet transport path 110. For example, the optical sheet sensor 170 may be located between 8-12 mm above the sheet transport path 110. As a further example, the optical sheet sensor 170 can be located substantially 10 mm above the sheet transport path 110. The distance from the sheet transport path 110 to the optical sheet sensor 170 can be any useful distance based on the design of the apparatus 100. If the sheet transport path 110 is substantially 3 mm wide 119 in the y-direction 164, the optical sheet sensor 170 can be substantially 13 mm from the reflector 130, within a range of, for example +/−2 mm, depending on design considerations.

The optical sheet sensor 170 can output a signal in response to receiving reflected light 132 reflected off the reflector 130. The signal can correspond to a location of the sheet 116 in the sheet transport path 110. The signal can be a voltage level corresponding to the reflected light 132 received at the optical sheet sensor 170. The voltage level can be based on an x-axis 162 location based on a direction 161 of sheet travel through the sheet transport path 110. The sheet transport path 110 can include a first baffle 112 and a second baffle 114. The voltage level can also be based on a y-axis 164 location based on a location of the sheet 116 between the first baffle 112 and the second baffle 114 of the sheet transport path 110. Differences in voltage levels at different times based on differences in the x-axis 162 location and the y-axis 164 location can be substantially zero at a given x-axis 162 location and a given y-axis 164 location. A trip point can substantially correspond to the differences in voltage levels being substantially zero, where the trip point can indicate an edge of the media 116 is proximal to the optical sheet sensor 170. For example, as the sheet 116 begins to pass through the sensor 170 and the reflector 130, a voltage level output from the sensor 170 can begin to change as the reflected light 132 becomes obstructed by the sheet 116. The voltage level can gradually change from 5 v to 1 v as the sheet blocks more of the reflected light 132. The actual voltage level may depend on the type of sensor 170 used in the apparatus 100. The controller 160 can have a threshold voltage that it can use to determine when the lead edge 116 or the trail edge 118 is at the sensor location along the x-axis 162. As a further example, the controller 160 may determine the lead edge 117 is at the sensor location when the sensor 170 output voltage reaches a trip point value of 2.5 volts. This trip point value may be set and may be adjusted based on the needs and the application of the apparatus 100. For example, the trip point value may be set somewhere within a range of approximately 2 volts and 4 volts or even substantially between 2 volts and 3 volts.

Figure 2:
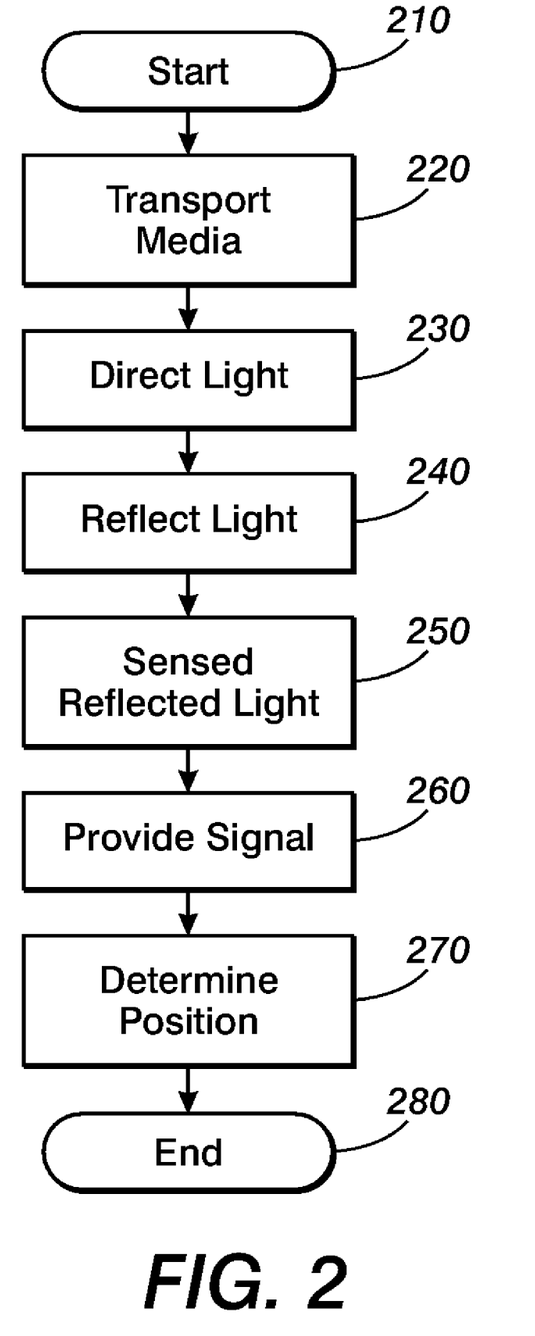
FIG. 2 is an exemplary flowchart illustrating the operation of the present disclosure according to a possible embodiment.

FIG. 2 illustrates an exemplary flowchart 200 of a method of detecting a position of media in an apparatus having a media transport path, an optical transmitter, a concave reflector, and an optical receiver. The concave reflector can be located at a distance from the optical receiver and a radius of the concave reflector can substantially match the distance from the concave reflector to the optical receiver. The method starts at 210. At 220, media is transported in the media transport path. At 230, light is directed from the optical transmitter to the concave reflector as media is transported in the media transport path. At 240, light is reflected off the concave reflector to direct reflected light through the media transport path to the optical receiver. At 250, the reflected light is sensed at the optical receiver. At 260, a signal is provided based on the sensed reflected light. The signal can have a voltage level based on the sensed reflected light and the voltage level can change when media in the media transport path obstructs the reflected light. At 270, a position of the media in the media transport path is determined based on the signal. A position of the media in the media transport path can be determined based on the voltage level crossing a trip point threshold voltage level. At 280, the method ends.

Figure 3:
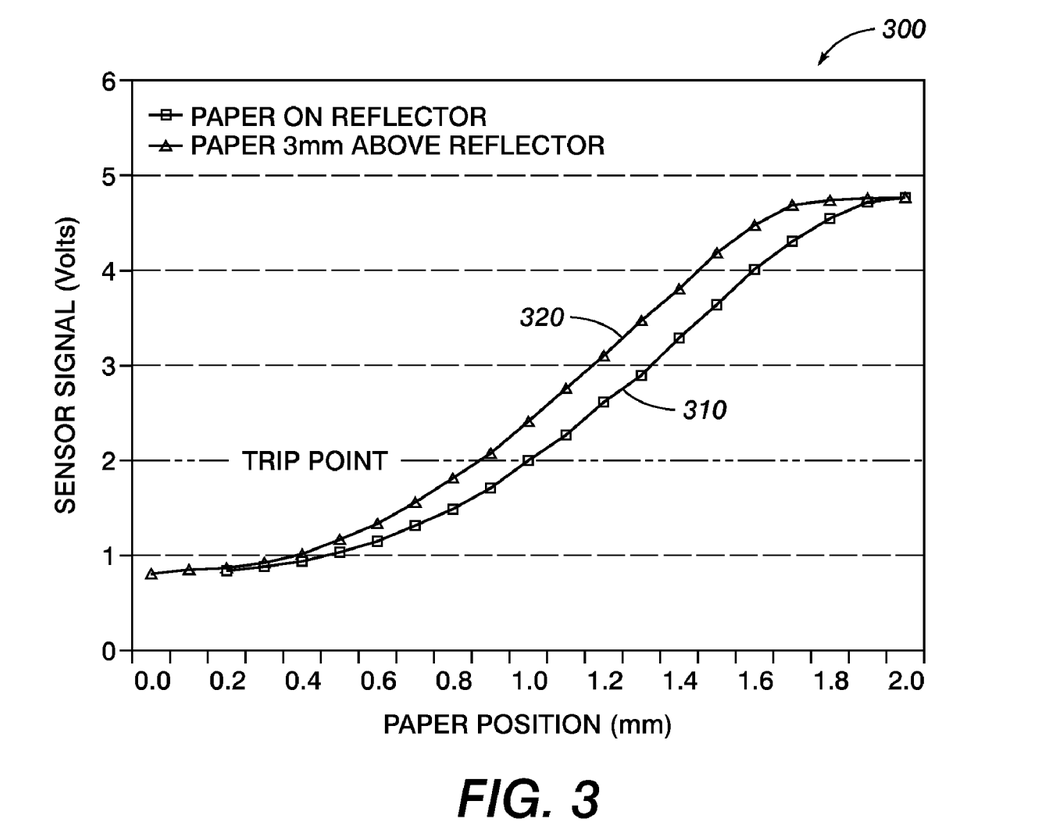
FIG. 3 is an exemplary graph illustrating sensor signals with respect to media lead edge position without a curved reflector.

FIG. 3 is an exemplary graph 300 illustrating sensor signals with respect to media lead edge position without a curved reflector. The graph 300 shows micrometer measurements 310 taken when media 116, such as paper, is substantially on a reflector and measurements 320 taken when the media 116 is 3 mm above a reflector as the lead edge 117 of the media passes over the reflector. With a trip point of 2 volts as a reference, the graph 300 shows an error of approximately 0.13 mm due to the 3 mm difference in fly height.

Figure 4:
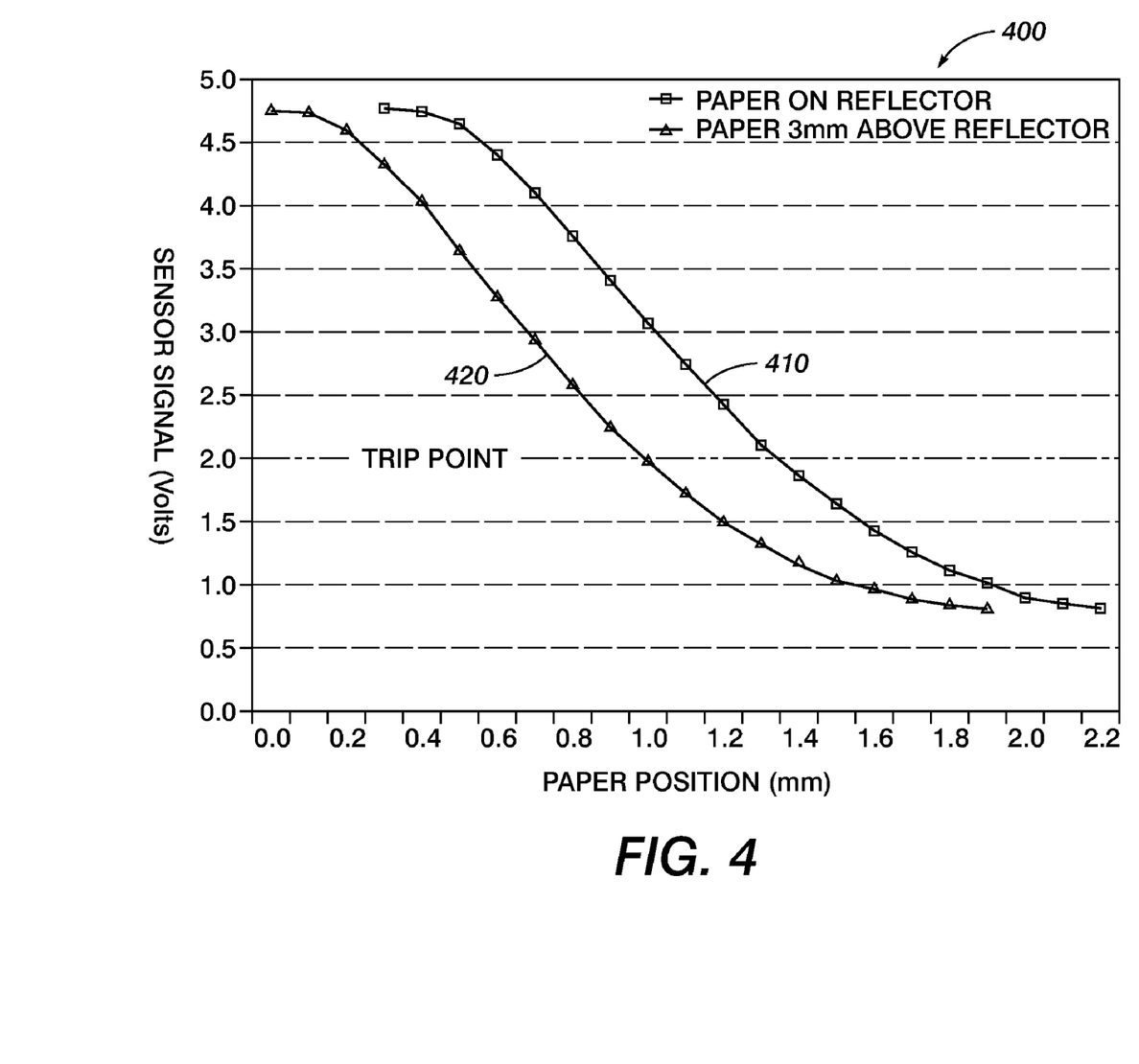
FIG. 4 is an exemplary graph illustrating sensor signals with respect to trail edge media position without a curved reflector.

FIG. 4 is an exemplary graph 400 illustrating sensor signals with respect to trail edge media position without a curved reflector. The graph 400 shows micrometer measurements 410 taken when media 116, such as paper, is substantially on a reflector and measurements 420 taken when the media 116 is 3 mm above a reflector as the trail edge 118 of the media 116 passes over the reflector. With a trip point of 2 volts as a reference, the graph 400 shows an error of approximately 0.34 mm due to the 3 mm difference in fly height.

Figure 5:
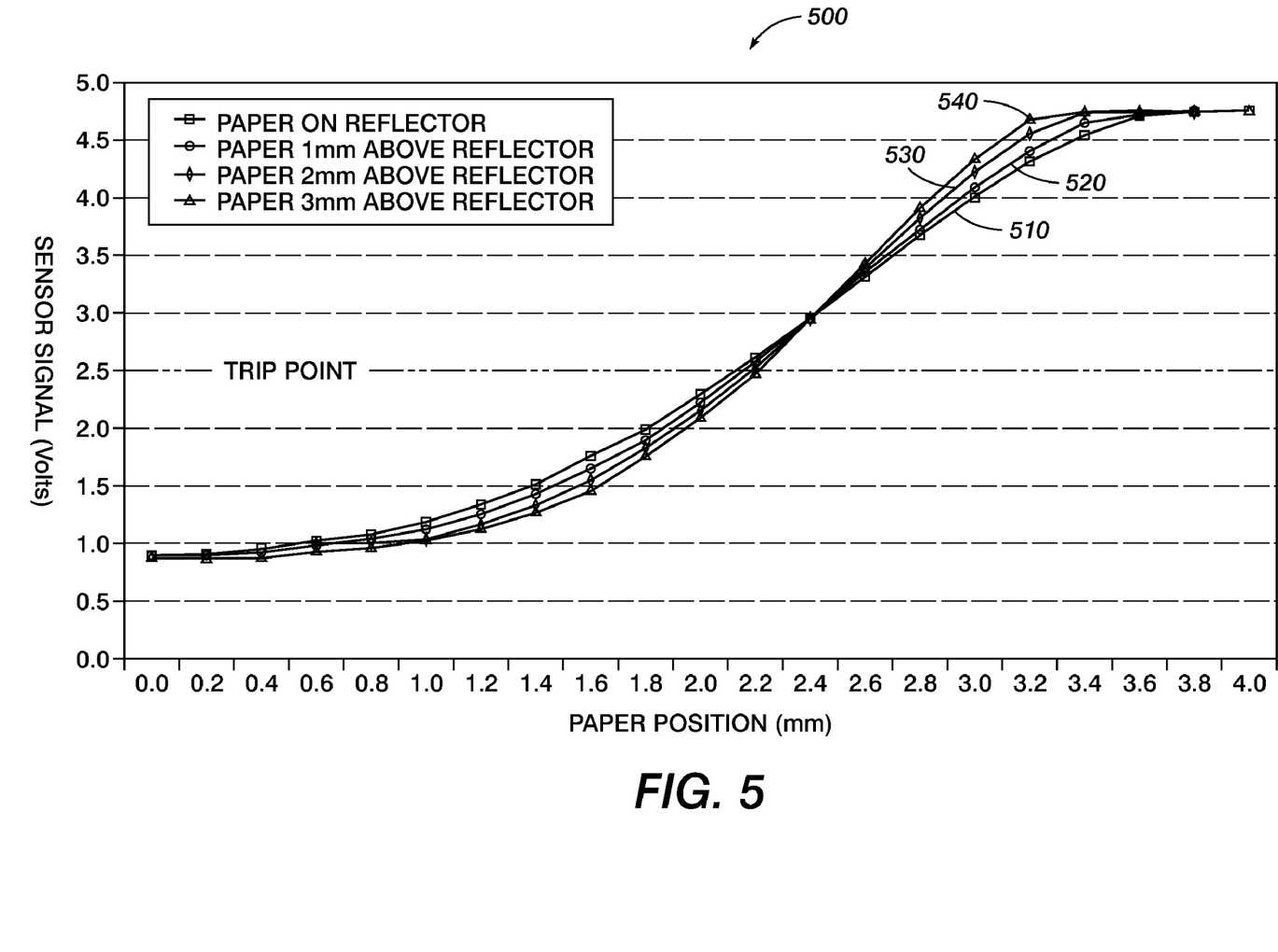
FIG. 5 is an exemplary graph illustrating sensor signals with respect to lead edge media position with a curved reflector according to a possible embodiment.

FIG. 5 is an exemplary graph 500 illustrating sensor signals with respect to lead edge media position with a curved reflector according to a possible embodiment. This example and other subsequent examples can use a reflector 130 with a radius of 12.5 mm, which can correspond to the distance 142 of the sensor 170 to the reflector 130. The graph 500 shows micrometer measurements 510 taken when media 116, such as paper, is substantially on the reflector 130, measurements 520 taken when the media 116 is 1 mm above the reflector 130, measurements 530 taken when the media 116 is 2 mm above the reflector 130, and measurements 540 taken when the media 116 is 3 mm above the reflector 130 as the lead edge 117 of the media 116 passes over the reflector 130. With a trip point of 2.5 volts as a reference, the graph 500 shows an error of approximately only 0.08 mm due to the 3 mm difference in fly height. Also, as shown in the graph 500, the receiver's voltage output waveforms can intersect around the midlevel at approximately 3 volts, regardless of the media's fly height. Thus, differences in voltage levels based on differences in the x-axis 162 location and the y-axis 164 location can be substantially zero at a given x-axis 162 location and a given y-axis 164 location and a trip point can be set, for example, at approximately 3 volts, to substantially correspond to the differences in voltage levels being substantially zero. Therefore, the trip point can more accurately indicate the location of an edge of the media 116 by indicating the edge is proximal to the optical sheet sensor 170. For example, the graph 500 shows the measurement curves 510, 520, 530 and 540 intersecting, as opposed to the curves 310 and 320 on graph 300, which correspond to a standard sensor setup, and which show the curves not intersecting. The non-intersecting curves illustrate the error due to fly height variation. If a sensor control board, such as the controller 160, is set to trip, such as report that the media 116 is proximal to the sensor, at 2.5 volts, the trip point can be relatively consistent regardless of the fly height when using a curved reflector 130.

Figure 6:
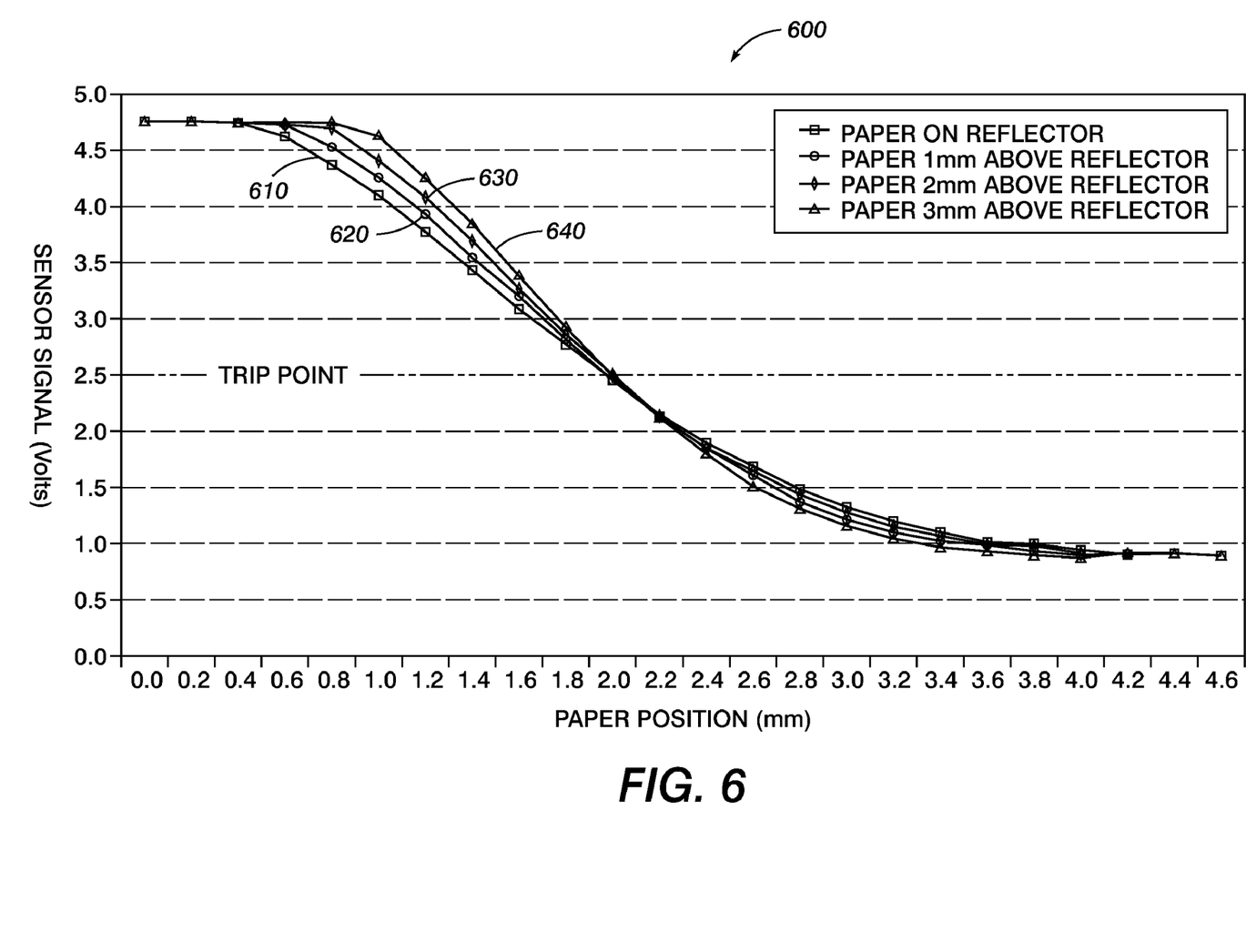
FIG. 6 is an exemplary graph illustrating sensor signals with respect to trail edge media position with a curved reflector according to a possible embodiment.

FIG. 6 is an exemplary graph 600 illustrating sensor signals with respect to trail edge media position with a curved reflector according to a possible embodiment. The graph 600 shows micrometer measurements 610 taken when media 116, such as paper, is substantially on the reflector 130, measurements 620 taken when the media 116 is 1 mm above the reflector 130, measurements 630 taken when the media 116 is 2 mm above the reflector 130, and measurements 640 taken when the media 116 is 3 mm above the reflector 130 as the trail edge 118 of the media 116 passes over the reflector 130. With a trip point of 2.5 volts as a reference, the graph 600 shows an error of approximately only 0.02 mm due to the 3 mm difference in fly height. Also, as shown in the graph 600, the receiver's voltage output waveforms can intersect around the midlevel at approximately 2.5 volts, regardless of the media's fly height. Thus, differences in voltage levels based on differences in the x-axis 162 location and the y-axis 164 location can be substantially zero at a given x-axis 162 location and a given y-axis 164 location and a trip point can be set, for example, at approximately 2.5 volts, to substantially correspond to the differences in voltage levels being substantially zero. The trip point may also be set to most accurately reflect both the lead edge 117 and the trail edge 118 position of the media 116. For example, the trip point can be set for 2.5 volts or somewhere between 2.5 and 3 volts for the example scenario shown in both graph 500 and graph 600. As the graphs are only examples, additional adjustments and measurements can be made to set the trip point.

Figure 7:
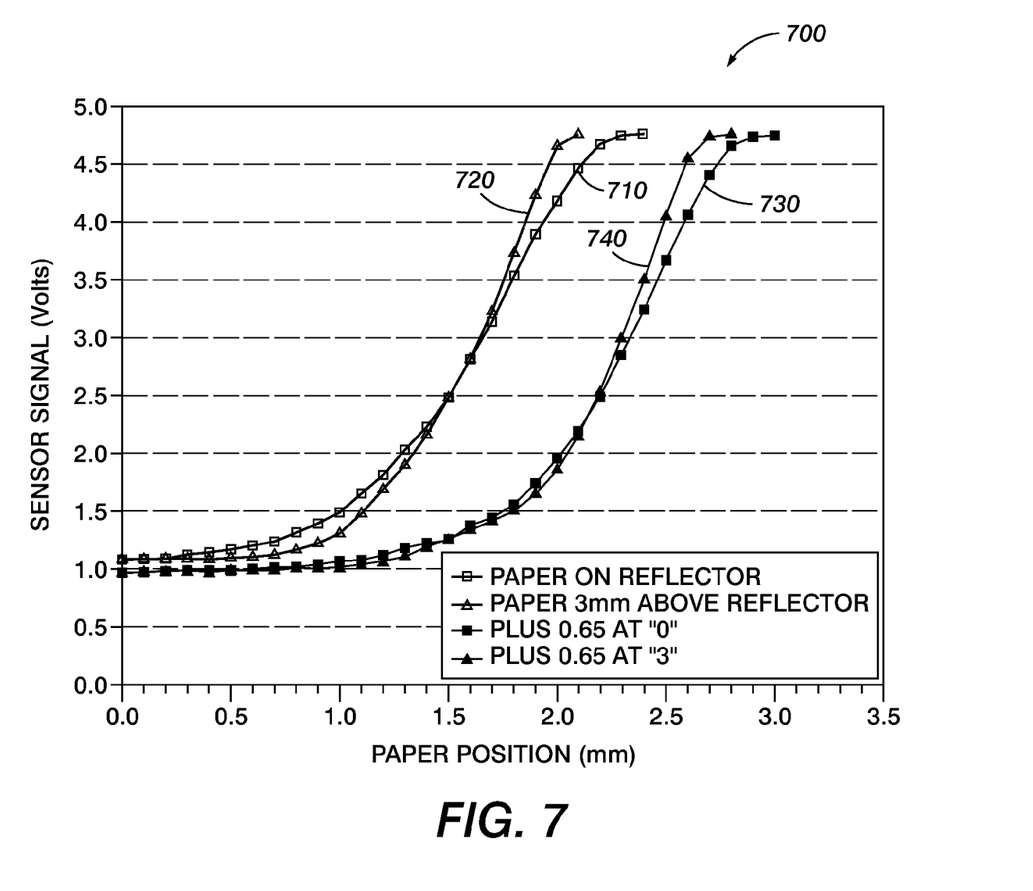
FIG. 7 is an exemplary graph illustrating sensor signals with respect to lead edge media position with a curved reflector according to a possible embodiment.

FIG. 7 is an exemplary graph 700 illustrating sensor signals with respect to lead edge media position with a curved reflector according to a possible embodiment. The graph 700 shows micrometer measurements 710 taken when media 116, such as paper, is substantially on the reflector 130 and measurements 720 taken when the media 116 is 3 mm above the reflector 130 as the lead edge 117 of the media 116 passes over the reflector 130. The graph 700 also shows measurements 730 taken when the media 116 is substantially on the reflector 130 and measurements 740 taken when the media 116 is 3 mm above the reflector 130 as the lead edge 117 of the media 116 passes over the reflector 130 after the reflector 130 was moved 0.65 mm in the media travel direction 161. With a trip point of 2.5 volts as a reference, the graph 700 shows there is minimal error due to the 3 mm difference in fly height, even when the reflector 130 is moved and the sensor 170 is kept in the original position.

Thus, the present disclosure can provide a method and apparatus for analyzing the position of media in a media path which reduce or even eliminate error due to media fly height variation. A concave reflector can be used to produce a reflected beam that can reduce and effectively eliminate sensor trip point variation with respect to the media position. The method and apparatus can reduce or eliminate lead edge error, reduce or eliminate trail edge error, and provide other media detection benefits.

Embodiments may preferably be implemented on a programmed processor. However, the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the embodiments. For example, one of ordinary skill in the art of the embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. An apparatus comprising:
   a media transport configured to transport media;
   an optical transmitter coupled to the media transport, the optical transmitter configured to transmit light;
   a concave reflector coupled to the media transport and optically coupled to the optical transmitter, the concave reflector configured to reflect light from the optical transmitter;
   an optical receiver coupled to the media transport, the optical receiver configured to receive light from the optical transmitter reflected off the concave reflector; and
   a controller configured to determine a position of the media based on the received light from the optical transmitter reflected off the concave reflector,
   wherein the media transport comprises a first side and a second side,
   wherein the optical transmitter and the optical receiver are coupled to the first side of the media transport, and
   wherein the concave reflector is coupled to the second side of the media transport.

2. The apparatus according to claim 1, wherein the optical receiver is located at a distance from the concave reflector, and
wherein the concave reflector has a radius that substantially matches the distance from the optical receiver to the concave reflector.

3. The apparatus according to claim 1, further comprising at least one driven drive roll coupled to the media transport, the driven drive roll configured to feed document media between the concave reflector and the optical receiver.

4. The apparatus according to claim 1, wherein the first side of the media transport comprises a first baffle and the second side of the media transport comprises a second baffle and the first baffle is located a distance from the second baffle of between substantially 2 mm and substantially 5 mm.

5. The apparatus according to claim 1, wherein the optical receiver outputs a signal in response to receiving light from the optical transmitter, the signal corresponding to a location of media in the media transport.

6. The apparatus according to claim 5,
wherein the signal comprises a voltage level corresponding to light received at the optical receiver,
wherein the voltage level is further based on an x-axis location based on a direction of media travel through the media transport, and
wherein the voltage level is further based on a y-axis location based on the location of the media between the optical receiver and the concave reflector.

7. The apparatus according to claim 6, wherein differences in voltage levels based on differences in the x-axis location and the y-axis location are substantially zero at a given x-location and a given y-location, and
wherein the controller is configured to determine a position of the media based on a trip point substantially corresponding to the differences in voltage levels being substantially zero, the trip point indicating an edge of the media is proximal to the optical receiver.

8. The apparatus according to claim 5,
wherein the signal comprises a voltage level corresponding to light received at the optical receiver,
wherein the media includes a lead edge and a trail edge, and
wherein the controller is configured to determine a position of the lead edge of the media based on a trip point corresponding to the voltage level crossing a threshold and the controller is configured to determine a position of the trail edge of the media based on the trip point corresponding to the voltage level crossing the threshold.

9. The apparatus according to claim 1, wherein the media transport is configured to transport media comprising one selected from the group of paper media, transparency media, cardboard media, and plastic media.

10. An apparatus comprising:
a sheet transport path configured to transport a sheet in a movement direction in the sheet transport path;
a reflector coupled to the sheet transport path;
an optical sheet sensor optically coupled to the reflector, the optical sheet sensor including:
a transmitter configured to transmit light in a direction of the reflector; and
a receiver configured to receive light transmitted from the transmitter and reflected off the reflector; and
a controller configured to determine a position of the sheet based on the received light reflected off the reflector,
wherein the reflector is concave towards the optical sheet sensor,
wherein the sheet transport path comprises a first side and a second side,
wherein the optical sheet sensor is coupled to the first side of the sheet transport path, and
wherein the reflector is coupled to the second side of the sheet transport path.

11. The apparatus according to claim 10, wherein the optical sheet sensor is configured to sense a lead edge corresponding to a beginning of the sheet and a trail edge corresponding to the end of the sheet transported through the sheet transport path in the movement direction.

12. The apparatus according to claim 10,
wherein the optical sheet sensor is located at a distance from the reflector, and
wherein the reflector has a radius that substantially matches the distance from the optical sheet sensor to the reflector.

13. The apparatus according to claim 10, further comprising at least one driven drive roll coupled to the sheet transport path, the driven drive roll configured to feed the sheet in the movement direction between the reflector and the optical sheet sensor.

14. The apparatus according to claim 10, wherein the optical sheet sensor outputs a signal in response to receiving light reflected off the reflector, the signal corresponding to a location of the sheet in the sheet transport path.

15. The apparatus according to claim 14,
wherein the sheet transport path comprises a first baffle and a second baffle,
wherein the signal comprises a voltage level corresponding to the light received at the optical sheet sensor,
wherein the voltage level is further based on an x-axis location based on a direction of sheet travel through the sheet transport path, and
wherein the voltage level is further based on a y-axis location based on a location of the sheet between the first baffle and the second baffle of the sheet transport path.

16. The apparatus according to claim 15,
wherein differences in voltage levels based on differences in the x-axis location and the y-axis location are substantially zero at a given x-axis location and a given y-axis location, and
wherein the controller is configured to determine a position of the sheet based on a trip point substantially corresponding to the differences in voltage levels being substantially zero, the trip point indicating an edge of the media is proximal to the optical sheet sensor.

17. A method of detecting a position of media in an apparatus having a media transport path, an optical transmitter, a concave reflector, and an optical receiver, the method comprising:
transporting media in the media transport path;
directing light from the optical transmitter to the concave reflector as media is transported in the media transport path;
reflecting the light off the concave reflector to direct reflected light through the media transport path to the optical receiver;
sensing the reflected light at the optical receiver;
providing a signal based on the sensed reflected light; and
determining a position of the media in the media transport path based on the signal,
wherein the media transport path comprises a first side and a second side,
wherein the optical transmitter and the optical receiver are coupled to the first side of the media transport path, and wherein the concave reflector is coupled to the second side of the media transport path.

18. The method according to claim 17,
wherein the concave reflector is located a distance from the optical receiver and the concave reflector has a radius that substantially matches the distance from the optical receiver,
wherein providing a signal comprises providing a signal having a voltage level based on the sensed reflected light, the voltage level changing when media in the media transport path obstructs the reflected light, and
wherein determining a position of the media comprises determining a position of the media in the media transport path based on the voltage level crossing a trip point threshold voltage level.

* * * * *